United States Patent [19]

Carl

[11] 4,255,896
[45] Mar. 17, 1981

[54] HYDROPONIC GROWING APPARATUS

[76] Inventor: Vincent P. Carl, 2633 Whidby La., Anaheim, Calif. 92806

[21] Appl. No.: 47,914

[22] Filed: Jun. 12, 1979

[51] Int. Cl.³ .............................................. A01G 31/00
[52] U.S. Cl. ......................................... 47/62; 47/79; 47/82
[58] Field of Search .................. 47/39, 59, 60, 61, 62, 47/63, 64, 73, 82, 79, 18, 65

[56] References Cited

U.S. PATENT DOCUMENTS

| D. 243,113 | 1/1977 | Hirsch | 47/59 X |
|---|---|---|---|
| 1,222,648 | 4/1917 | Marks | 47/18 |
| 2,121,461 | 6/1938 | Widmann | 47/61 |
| 2,971,290 | 2/1961 | Kyle | 47/60 |
| 3,352,057 | 11/1967 | Ferrand | 47/62 |
| 3,365,840 | 1/1968 | Cooper | 47/82 |
| 3,841,023 | 10/1974 | Carlyon | 47/79 |
| 3,973,316 | 8/1976 | Maher | 47/73 |
| 4,075,785 | 2/1978 | Jones | 47/64 |
| 4,083,147 | 4/1978 | Garrick | 47/80 |
| 4,092,803 | 6/1978 | Naylor | 47/62 |
| 4,106,235 | 8/1978 | Smith | 47/59 |
| 4,118,891 | 10/1978 | Kehl et al. | 47/59 |

FOREIGN PATENT DOCUMENTS

| 1491459 | 8/1967 | France | 47/59 |
|---|---|---|---|
| 45-28527 | 9/1970 | Japan | 47/59 |

OTHER PUBLICATIONS

Anon. (Sales Brochure) "Ka-En" (Cultivation Apparatus) Model PX1001 Published By Matsushita Electric Co. (Japan) pp. 1-4.
Anon. (Sales Brochure) "Sai-En" (Vegetable Garden) Model PX-2001 Published By Matsushita Electric Co. (Japan) pp. 1 and 2.

Primary Examiner—James R. Feyrer
Attorney, Agent, or Firm—Knobbe, Martens, Olson, Hubbard & Bear

[57] ABSTRACT

A hydroponic plant growing apparatus is disclosed wherein a nutrient enriched liquid is flowed within a series of ducts adapted to mount a plurality of planting cups, each of which support a sterile media and a plant seedling. The planting cup includes an apertured bottom surface which permits capillary action of the nutrient liquid into the support media as well as allows the root system of each plant to extend into the duct yet isolates the sterile media from direct flow contact with the nutrient liquid. The individual plant cups eliminate contamination of the nutrient liquid, facilitate easy removal and replacement of individual plants on the apparatus, and form an effective seal with the ducts yielding a substantially hermetically sealed apparatus which is not susceptible to rain contamination, evaporation, or algae growth.

8 Claims, 5 Drawing Figures

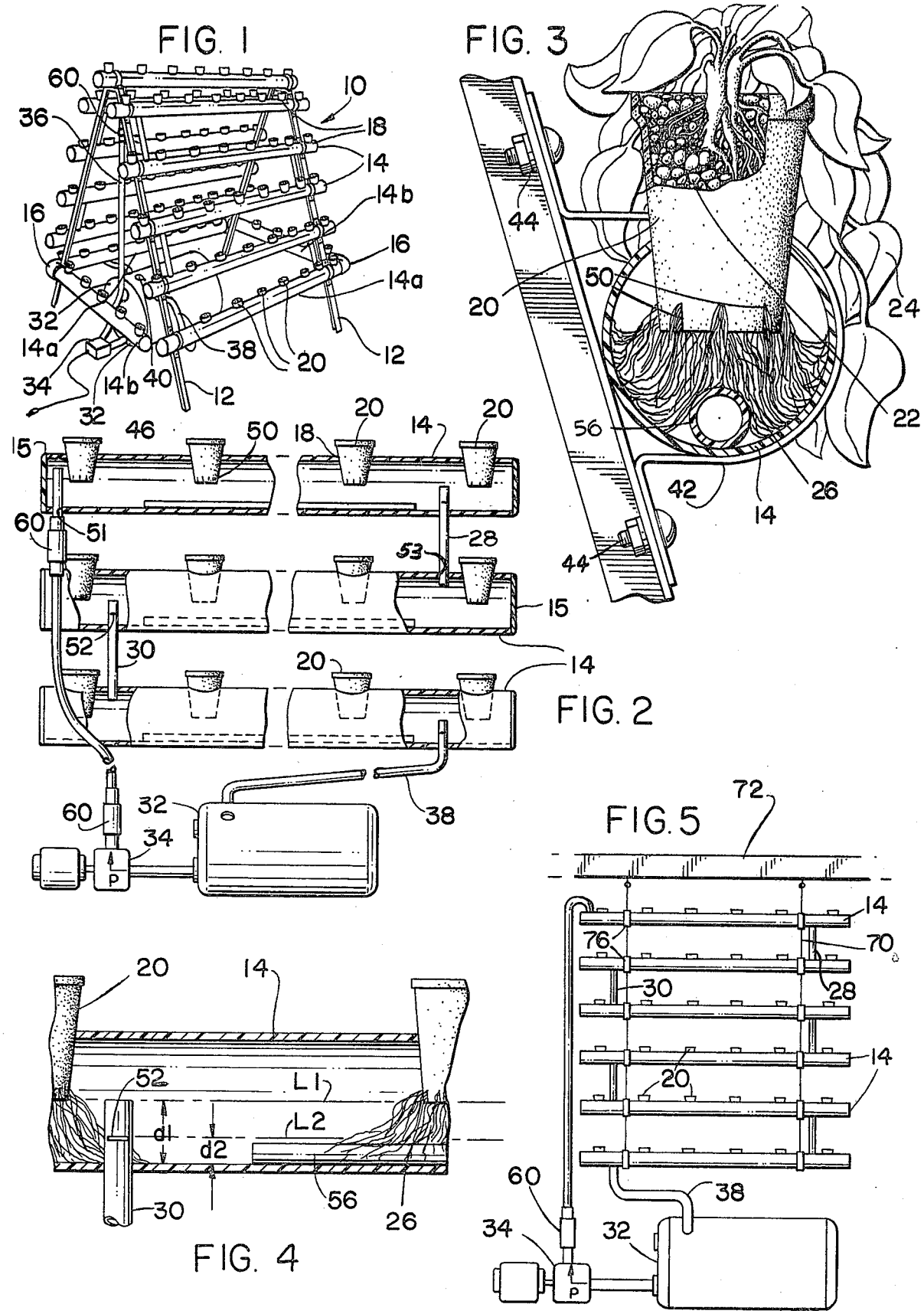

HYDROPONIC GROWING APPARATUS

BACKGROUND OF THE INVENTION

The present invention relates to hydroponic growing apparatus and more particularly to hydroponic growing apparatus wherein individual planting cups are utilized to substantially isolate the sterile support media from the direct flow of the nutrient enriched liquid.

In recent years, there has been a dramatic resurgence in the development and use of hydroponic growing systems (i.e., growing plants in water containing essential nutrients without dependence upon soil) in both commercial and residential applications. Such hydroponic systems have the advantages of controlled or regulated water and nutrient supply to the plants which has been found to substantially increase the growth rate and overall productivity of the plant.

Typically, prior art hydroponic systems have comprised plural open top flat bed containers which are nested one on top of the other in a vertical orientation. The upper container typically supports a sterile support media such as vermiculi, into which is inserted a plurality of individual plants, whereas the lower container typically forms a storage reservoir for the nutrient enriched solution. In operation, the nutrient solution is circulated from the lower to upper container by either (1) drip irrigation, where the prepared solution is dripped into the sterile media, (2) wick irrigation, wherein a wick transfers the solution from the lower to the upper container, or (3) flood irrigation, wherein the solution is pumped through the support media and allowed to drain out into the reservoir. Although all of these prior art hydroponic systems have proven useful in their limited application, there exists inherent deficiencies in their overall operation.

In particular, the prior art systems are highly susceptible to media contamination due to the direct exposure of the support media with the nutrient liquid flow. By dripping or flooding the support media directly with the nutrient solution, the media acts as a filter which after prolonged use, accumulates undissolved salts and other organic materials. Such filtration build-up increases the pH balance of the media and also adversely affects the sterility of the media often causing root and soil type diseases to propagate and damage the plants.

Additionally, with typical prior art hydroponic systems, there are no provisions for easy removal of individual plants from the apparatus. Each time a plant is desired to be removed from the apparatus, the plant must be pulled or dug out of the media usually resulting in a substantial portion of the root structure being broken off and left behind in the sterile media. After a short period of time, these broken roots begin to decompose causing contamination of the media which progressively alters the chemical makeup or quality of the nutrients available to the plant. In this same regard, the broken roots often pass into the reservoir lodging in restrictive areas of the flow conduits or entering into the internal components of the pumping unit thereby causing system blockage.

The open growing bed design of the prior art hydroponic apparatus is also extremely vulnerable to excessive evaporation of the nutrient solution as well as periodic flooding by rain. Excessive evaporation of the water from the nutrient solution yields an abundance of nutrient materials being provided to the plant, which, in most cases, effects plant growth. Alternatively, if the hydroponic apparatus is exposed to substantial rain, the growing bed and/or reservoir may become flooded thereby resulting in excessive moisture in the plant bed which causes root rot and dilution of the nutrient liquid in the reservoir. As such, the prior art hydroponic growing apparatus have typically been located in greenhouses wherein evaporation may be controlled and exposure to rain may be eliminated.

Further, due to the filtration of the media in the prior art and the failure to provide for easy plant removal, the prior art systems require frequent system clean-outs. These clean-outs necessitate that all of the plants growing in the bed be dug up and removed, the growing media be thoroughly rinsed or replaced, and the subsequent repositioning of the media and plants back into the growing bed. In addition to the substantial period of time to complete the clean-out procedure, it is often necessary to plant new plants in the bed since the more mature plants will be damaged and severely shocked when removed from the media.

In addition, the majority of prior art hydroponic growing apparatus have comprised relatively large and expensive systems being specifically adapted for commercial greenhouse applications. As such, there exists a need for an economical residential and/or commercial hydroponic growing apparatus which prevents contamination of the sterile media, provides for easy removal of individual plants from the apparatus and may be effectively utilized in outdoor applications without the need for a greenhouse environment.

SUMMARY OF THE PRESENT INVENTION

The present invention provides a hydroponic growing apparatus which can be effectively utilized in both commercial and industrial applications and substantially eliminates the deficiencies of the prior art apparatus.

The hydroponic apparatus of the present invention is basically composed of a series of tubes or ducts which support a plurality of plants maintained in individual planting cups. The lower surface of the planting cup extends partially into the duct and is provided with a series of slot-like apertures sized to permit the roots of the plant to extend within the duct yet maintain the sterile media in a substantially isolated condition from the direct flow of the nutrient liquid.

The nutrient solution is initially supplied to the ducts by a pumping unit and thereafter travels under gravity flow through the ducts in a series path. The nutrient solution is maintained at dual levels during operation of the apparatus thereby ensuring that proper amounts of water and nutrients are provided to the plants. At the first level, the nutrient liquid slightly contacts or wets the lower surface of the planting cup thereby allowing capillary action to draw the liquid into the sterile media to nourish young plants or seedlings. At a second level, the nutrient liquid is only present in the lower portion of each duct to continuously feed the root system of the more mature plants. As such, the media does not filter the nutrient liquid and thus does not become contaminated after prolonged use.

In addition, the hydroponic apparatus of the present invention facilitates easy removal of individual plants from the apparatus by simply removing the plant cup from the duct. As will be recognized, due to the upper root structure of the plants and sterile support media being isolated within the plant cup, the planting cup, media, and plant may be readily lifted from the apparatus as an integral unit, without disturbing the plant within the media or tearing the root system. Further, by this same procedure, individual plants may be readily relocated upon the apparatus to facilitate more direct exposure to the incident sunlight or shade.

Additionally, the individual plant cups form a substantially air-tight seal with the ducts which, in combination with the closed flow communication between individual ducts, provides a substantially hermetically sealed hydroponic growing apparatus. As such, the evaporation and rain flooding deficiencies associated in the prior art are substantially eliminated with the attendant elimination of the greenhouse hydroponic environments.

Further, due to the sterile media being maintained within the planting cup, and substantially isolated from the direct nutrient flow, scheduled clean-out of the hydroponic system is substantially reduced typically being necessitated only once every 5 to 6 months. In this same regard, the present invention provides a quick disconnect supply conduit which facilitates complete clean-out of the apparatus with a garden hose in a matter of minutes. Additionally, in the preferred embodiment, the plural ducts of the apparatus are arranged in a vertically stacked arrangement which support a maximum number of plants in a minimum surface area. Thus, significant plant yield can be obtained with a minimum of floor space being occupied by the apparatus.

DESCRIPTION OF THE DRAWINGS

These and other features of the present invention will become more apparent upon reference to the drawings wherein:

FIG. 1 is a perspective view of the hydroponic growing apparatus of the present invention showing the vertical stacked arrangement of ducts upon a support frame with the individual planting cups mounted on each duct;

FIG. 2 is an enlarged partial cross-sectional view of three of the ducts of the apparatus of FIG. 1 showing the spacial relationship between the planting cups, inlet tube, outlet tube, and bypass tube;

FIG. 3 is an enlarged cross-sectional view of one of the ducts of the present invention showing its mounting to the support frame and the orientation of the planting cup and root system of the plant within the duct;

FIG. 4 is a partial longitudinal sectional view of one of the ducts of the present invention depicting the dual nutrient flow level of the present invention; and FIG. 5 is a elevational view of an alternative embodiment of the hydroponic apparatus of the present invention with the ducts arranged in a vertical ladder-like configuration.

DETAILED DESCRIPTION OF THE PREFERRED EMBODIMENT

Referring to FIG. 1, there is shown the hydroponic growing apparatus 10 of the present invention composed generally of a pair of A-shaped frame members 12 which mount a plurality of closed end pipe members or ducts 14. As shown, the ducts 14 are preferably arranged in parallel pairs extending in horizontal planes along the front and rear of the apparatus. In the preferred embodiment, the lower-most pair of ducts 14A are each provided with an additional duct segment 14B which extends perpendicular to the ducts 14A being connected thereto by way of an elbow 16.

The upper portion of each of the ducts 14 is provided with a plurality of annular apertures 18 which slidingly receive individual planting cups 20. As will be explained in more detail infra, each of the planting cups 20 support a sterile media 22 and an individual plant 24 and permit the root system 26 of the plant 24 to extend within the interior of the duct 14 (as shown in FIG. 3).

The ducts 14 are interconnected with one another by an inlet tube 28 and an outlet tube 30 which are positioned at opposite ends of each of the ducts 14 adjacent the top and bottom of the duct, respectively. A reservoir 32 is additionally provided which stores a quantity of nutrient enriched liquid (i.e., fertilizer and water) having an electric pump 34 connected thereto. As shown, the pump 34 is connected to the upper-most duct 14 by a discharge conduit 36 whereas the reservoir 32 is connected to each of the lower-most ducts 14A by a pair of return conduits 38.

As will become more apparent below, with the pump 34 operating, the nutrient enriched liquid is pumped from the reservoir 32 through the conduit 36 to the upper-most duct 14 and flows through the conduit toward its opposite end. The upper-most duct 14 is provided with a manifold outlet (not shown) which splits the nutrient flow from the upper-most duct 14 into two separate channels, each of which enters a respective one of the next lower pair of ducts 14. Similarly, each of the nutrient streams flows through the length of its respective duct 14 entering the next lower duct by way of the outlet tube 30. As such, the nutrient liquid flows in a first series path through the ducts 14 of the front side of the apparatus and a serial series path through the ducts 14 of the rear side of the apparatus, being subsequently discharged back into the reservoir 32 by way of the return conduits 38. As shown, the first and second series paths are in parallel with each other. To permit the introduction of additional water and/or nutrients into the apparatus 10, the reservoir 32 is additionally provided with a filler aperture 40 adjacent its top surface.

Referring to FIGS. 2 and 3, the detailed construction of the apparatus 10 of the present invention may be described. The duct 14 is preferably fabricated of nominal three-inch internal diameter polyvinyl chloride pipe (PVC) having a pair of end caps 15 sealingly attached thereto. The ducts 14 are attached to the frame 12 by a generally U-shaped bracket 42 which is rigidly secured to the frame 12 by a pair of bolt fasteners 44.

In the preferred embodiment, each of the ducts 14 is formed having a pluraity of annular apertures 18 which extend through the upper portion of the duct 14. These apertures 18 are sized to slidingly receive the plant cup 20 permitting the cup 20 to extend partially within the interior of the duct 14.

The planting cup 20 is preferably composed of a semi-rigid resilient material which possess sufficient strength to support the media 22 and plant 24 while being relatively pliable to form a substantially air-tight seal or gasket when tightly inserted into the plant aperture 18. In the preferred embodiment, styrofoam cups are utilized which have been found to possess such qualities as well as being substantially inert to the moisture and organic materials contained in the nutrient liquid. Such styrofoam cups are produced by a variety of manufacturers for use as hot beverage containers and are available at extremely low cost. In particular, the applicant has found that a 6-ounce size SC-6, low cube styrofoam cup manufactured by the Sweetheart Cup Corporation, Los Angeles, California, may be effectively utilized in the apparatus 10. As shown, the cup 20 typically is formed having an annular tapered sidewall 48 with a minimum and maximum diameter of approximately 1¾ inches and 2⅜ inches, respectively. When this particular 6-ounce size cup 20 is utilized, the plant aperture 18 is sized to include a 2⅛ inch diameter which positions the lower surface 46 of the cup 20 at approximately the center line of the duct 14 when seated within the opening 18.

The lower surface 46 of the cup 20 is additionally provided with a plurality of elongate apertures or slots 50 which preferably extend across the entire lower diameter of the cup 20 and upward a short distance through its length. The width of the slots 50 is typically sized to be approximately 1/32 of an inch with the height approximately ⅜ to ½ inch. As best shown in FIG. 3, the cup 20 supports the sterile media 22 as well as the plant 24 within the interior of the duct 14. For purposes of this application, sterile media 22 describes a non-nutrient bearing material such as sand or gravel rather than the typical connotation of a non-bacterial material. Due to the relatively small size of the openings 50, the sterile media 22 is substantially maintained within the interior of the cup 20 while the roots 26 may extend easily therethrough.

As shown in FIG. 2, the outlet tube 30 is positioned adjacent one end of each of the ducts 14 and extends upward into the duct to a level (dl) equal to or slightly greater than the elevation of the lower surface 46 of the cup 20. In the preferred embodiment, the outlet tube 30 is formed of ¾ inch flexible reinforced vinyl tubing being press-fit into an aperture 51 formed in the lower surface of the duct 14. Due to the resiliency of the vinyl material, the tube 30 is maintained in its proper position within the duct 14 and forms a liquid-tight seal about the aperture 51. The outlet tube 30 is additionally provided with a slot 52 which is formed adjacent the upper end of the tube and extends through the wall of the tube 30 along a portion of its diameter.

An inlet tube 28 is additionally provided adjacent the opposite end of each duct 14 which similarly extends through an aperture 53 formed in the top surface of the duct 14. In the preferred embodiment, the inlet tube 28 extends only part-way into the duct 14 terminating at a level slightly above the level of the upper end of the outlet 30.

Disposed between the inlet 28 and outlet 30 and rigidly positioned along the lower surface of the ducts 14 is a bypass tube 56 which is preferably formed of half-inch polyvinyl chloride (PVC) pipe, which extends throughout the substantial length of each of the ducts 14. In the preferred embodiment, the bypass tube 56 initiates and terminates intermediate the first and second plant cups 20 located at the distal ends of each of the ducts 14 (shown in FIG. 3) thereby substantially eliminating the possibility of plant roots 26 blocking the ends of the tube 56. As such, the bypass tube 56 provides a substantially unrestricted secondary flow path for the nutrient liquid passing between the inlet and outlet even when the majority of the duct 14 is compacted with heavy root growth 26 from the individual plants 24.

With the structure defined, the operation of the hydroponic growing apparatus 10 of the present invention may be described herein. Although for description purposes the operation of the apparatus 10 will be described in relation to a single duct 14, it will be recognized that once the apparatus 10 has come to a steady-state condition, the same operations are occurring simultaneously in all of the ducts 14. As the nutrient liquid enters the duct 14 (as by way of the pump 34 and supply conduit 36 in a manner previously described) and travels toward the opposite ends of the duct 14, the liquid rises in the duct to a level L1 indicated in FIG. 4. As will be recognized, during this filling of the duct 14, some liquid travels through the outlet 30 by way of the slot 52. However, due to the relatively small size of the slot 52 in comparison to the volume of liquid being supplied to the duct 14, the liquid level quickly rises to the top of the outlet tube 30.

Subsequently, due to the inlet tube 28 and outlet tube 30 having the same inside diameter, a constant liquid level L1 is maintained within the duct 14 with the liquid entering through the inlet 28 traveling through the length of the duct 14 and out through the open end of the outlet tube 30. As previously mentioned, the end of the inlet tube 28 is preferably maintained slightly higher than the liquid level L1 such that liquid entering the duct 14 is aerated prior to its travel through the duct 14. As such, the nutrient enriched liquid is provided with sufficient oxygen to adequately nourish all the plants 24 during its flow through the ducts 14 of the apparatus 10. Further, in those instances where the root structure 26 becomes sufficiently dense to prohibit flow through the main section of the ducts 14, the bypass tube 24 permits the liquid to travel substantially unrestricted throughout the length of the ducts 14 thereby eliminating the possibility of overfilling the ducts 14.

As best shown in FIG. 4, with the nutrient liquid maintained at the level L1, the lower surface 46 of the plant cup 20 is slightly submerged within the liquid (i.e., wetted by the liquid). The distance that the cup 20 extends within to the interior of the duct 14 (and thus the diameter of the aperture 18) is critical, and must be maintained such that the lower surface 46 of the cup 20 is positioned at a depth dl equal to or slightly below the horizontal plane of the top surface of the outlet tube 30. This particular positioning of the cup 20 within the duct 14 permits the nutrient enriched liquid passing through the duct 14 to contact the lower surface 46 of the cup 20 and be drawn upward by capillary action into the media 22 through the slots 50 formed on the bottom surface of the cup 20 prior to exiting the outlet tube 30.

This natural capillary action provides, in effect, a self-regulating means for controlling the amount of liquid admitted to the sterile media 22 with the capillary action ending when sufficient liquid has been admitted into the media 22. Additionally, it will be recognized that as the liquid flows through the duct 14, interaction between the liquid and the media 22 is limited exclusively to the capillary action through the slots 50. As such, the media 22 is substantially isolated within the plant cup 20 from the direct flow of the liquid with the nutrient liquid being pulled up through the media rather than being filtered through the media 22 during operation. Thus, the build-up of salt and organic material which typically raises the pH level of the prior art system has been virtually eliminated with the attendant media contamination additionally being substantially reduced.

Depending upon the temperature of the environment, as well as the particular plants being grown in the apparatus, the nutrient flow is continued at the level L1 for a period of time sufficient to wet the media 22 within the cups 20 typically being approximately 1 hour. Subsequently, the pumping of the liquid through the ducts 14 is automatically discontinued as by way of an electric timer (not shown) connected to the pump 34. Upon discontinuance of the pumping cycle, the liquid maintained with the ducts 14 flows through the slot 52 formed in the outlet 30. The vertical positioning of this slot 52 within the duct 14 is not critical, but is typically maintained at approximately one-half the distance between the end of the tube 30 and the lower wall of the duct 14 (represented by the numeral d2 in FIG. 4) to facilitate a dual liquid level in the duct 14. As such, after a short period of time, the liquid level drops to a level L2 indicated in FIG. 4. As shown, at this second level L2, the lower surface 46 of the cup 20 is maintained above the nutrient liquid, whereas the roots 26 extending downward through the slots 50 of the cup 20 are submerged within the liquid. As such, the sterile media 22 is permitted to drain off any excess liquid to prevent dry rot of the roots 26 contained within the media 22, while the nutrient and atmosphere exposure of the mature roots 26 extending substantially into the duct 14 is maintained and facilitated respectively, both of which are necessary for proper plant growth.

As will be recognized, this lower level L-2 of nutrient liquid is continuously maintained within the duct 14 between pumping cycles such that the mature plants which require substantially more nutrient than young seedlings, are constantly exposed to the nutrient liquid. Similarly, this constant liquid level within the ducts 14 maintains a sufficient amount of moisture within the interior of the duct 14 during the non-pumping cycle of operation to prevent dehydration of the root systems in extremely warm environments. Further, it will be recognized that after a sufficient period of time, the timer (not shown) again initiates the pumping cycle wherein the above described procedure continues on a predetermined schedule throughout the day.

From the above, it will be recognized that due to the individual plant cups 20 forming a substantially air-tight seal about the plant apertures 18 and the outlet and inlet tubes 28 and 30 respectively, sealingly engaging the ducts 14, the apparatus 10 of the present invention provides a substantially hermetically sealed unit. As such, contamination of the nutrient liquid due to insecticides, bird droppings, or plant leaves which was present in the prior art, has been eliminated. Further, the liquid nutrient is effectively maintained within the apparatus 10 without exposure to the atmosphere, thereby substantially eliminating the possibility of evaporation from the apparatus. In this same regard, rain is effectively prevented from entering the system with the only possible access being through the open end of the plant cup 20 and through the media 22. However, due to upper growth of the plant 24 extending above the opening of the cup 20, the plant itself shields the cup 20 from rain, thereby allowing only minimal amounts to enter therethrough. As such, it will be recognized that the apparatus 10 of the present invention is not required to be positioned within the greenhouse but rather may be effectively utilized in open/outdoor installations.

When it is desirable to remove an individual plant from the apparatus 10, the removal may be accomplished in an easy manner without the necessity of digging up the plants 24 from the support media 22 as heretofore required. Rather, due to both the media 22 and plant 24 being supported within the planting cup 20, the plant 24, media 22, and plant cup 20 may be readily removed as an integral unit from the duct 16 simply by withdrawal of the cup 20 through the plant aperture 18.

During this withdrawal, the root structure 26 which typically extends downward and then outward in opposite directions through the conduit 14 as shown in FIG. 4, may be readily pulled through the aperture 18 with only iminimal tearing or damage to the roots 26 of the plant or adjacent plants.

Similarly, to reinsert a particular plant into the apparatus 10, the root system 26 extending below the lower surface of the plant cup 20, may be manually bunched together and pushed through the opening 18 with the cup 20 subsequently being tightly pressed within the aperture 18. As will be recognized, due to the relatively simple procedure required for inserting and removing plants from the apparatus, individual plants may be selectively rotated on the apparatus to facilitate exposure to the shade or sunlight in a manner of minutes and without damage to the individual plants.

In the preferred embodiment, the supply line 36 extending from the output of the pump 34 to the uppermost duct 14 is provided with a quick disconnect fastener 60 adjacent both of its ends. This quick disconnect fastener 60 permits the supply line 36 to be readily disconnected from the uppermost duct 14 and directed to a drain (not shown). Subsequently, by removing one of the plant cups 20 located on the uppermost duct 14 and inserting an inlet water supply, such as garden hose (not shown) therein, the ducts 14 may be completely flushed out with the incoming water supply traveling through each of the ducts and being discharged from the reservoir 32 into the drain by the pump 34. Thus, cleanout of the system may be accomplished in a manner of minutes without the necessity of removing the plants from the apparatus.

Referring to FIG. 5, an alternative embodiment of the hydroponic growing apparatus of the present invention is depicted. In this embodiment, rather than being arranged upon the rigid frame 12 (as shown in FIG. 1), the ducts 14 are interconnected to one another by a pair of flexible support lines 70 which extend between mounting collars 76 positioned on each duct 14 and are rigidly attached to an overhead beam or support member 72. As in the previous embodiment, the ducts 14 are each provided with a plurality of plant apertures 18 which each receive a plant cup 20, and are in flow communication with one another by way of the inlet and outlet tubing 28 and 30 respectively in a manner previously described.

In operation, the pump 34 elevates fluid from a reservoir 32 into the uppermost duct 14 wherein it proceeds in a series path in a manner previously described, through each of the remaining ducts, being subsequently returned to the reservoir 32. As will be recognized, by this particular design, the apparatus need not occupy any appreciable floor space, and may be readily mounted on a residential patio or other overhead structure.

It will be recognized from this disclosure that in both embodiments of the present invention, the ducts 14 are preferably maintained level such that the water level within the ducts 14 is substantially the same at both ends of the duct. However, minor variations in level will not affect the operation of the apparatus and thus the apparatus 10 may be readily installed without the need of a transit. Similarly, it will be noted that due to the relatively small size of the apparatus 10, the pump 34 disclosed herein is typically a light duty pump such as a 1.0–1.5 AMP outdoor fountain pump which supplies between 200–300 gallons of liquid per hour. Additionally, once the liquid has been elevated to the uppermost duct 14, the remainder of the liquid flow through the apparatus 10 is facilitated by gravity. Further, those skilled in the art will realize that although an A-frame and ladder arrangement (FIGS. 1 and 5 respectively) have been disclosed herein, various other arrangements of the ducts 14 may be utilized without departing from the spirit of the present invention.

I claim:

1. A hydroponic growing apparatus comprising:
   a hollow duct including an inlet and outlet positioned adjacent opposite ends of said duct to define a series flow path through said duct;
   means for circulating a liquid through said inlet and said outlet; and
   planting cup means removably mounted to said duct for supporting an inert media and a plant within said duct, said planting cup means including aperture means for permitting said liquid to be drawn by capillary action into said media while prohibiting said media from entering said liquid in said duct and for permitting the roots of the plant to extend through said aperture means below said cup means into the lower portion of said duct;
   said planting cup means sized to provide a drainage area within said duct below said aperture means; and
   means for cyclically varying the level of liquid between a first level wetting a portion of said media and a second lower level wetting only the extended roots but not said media at predetermined, time intervals to continuously maintain a sufficient quantity of liquid within said duct to prevent dehydration of said plant.

2. The apparatus of claim 1 wherein said planting cup means is formed of a substantially resilient material adapted to form a seal with said duct when said planting cup is mounted on said duct.

3. The apparatus of claim 1 wherein said duct includes a conduit means rigidly mounted within the interior of said duct and extending along the length of said duct, said conduit means providing a bypass passageway within said duct to ensure that said liquid may travel through the length of said duct.

4. The apparatus of claim 3 wherein said bypass extends substantially throughout the length of said duct between said inlet and said outlet.

5. A hydroponic growing apparatus in accordance with claim 1 and further comprising a plurality of said ducts and conduit means connecting said plurality of ducts to provide a series flow path for the liquid therethrough.

6. A hydroponic growing apparatus in accordance with claim 5 and further comprising means for aerating said liquid during circulation of said liquid through said series flow path.

7. A hydroponic growing apparatus in accordance with claim 1 and further comprising:
   pump means for circulating said liquid through said duct; and
   said means for cyclically varying the level of liquid comprising means for cyclically actuating and de-actuating said pump, said liquid level rising to said first level when said pump is actuated, and lowering to said second level when said pump is deactuated.

8. A hydroponic apparatus for growing plants in a soilless environment comprising:
   a hollow duct disposed generally horizontally and having a plurality of apertures formed in its top;
   a plurality of cups each adapted to be placed in one of said apertures and extending part way into said duct with the bottom of each cup spaced above the bottom of said duct;
   aperture means in each cup for permitting the roots of a plant contained in the cup to extend out of the cup into the duct portion below the cup, while retaining the planting media in the cup;
   inlet means at one end of said duct;
   outlet means at the other end of said duct;
   means for supplying liquid to said inlet to flow through the duct in contact with the roots of plants in the lower portion of the duct and out said outlet; and
   a bypass conduit being root impermeable along its length and located in the lower portion of said duct extending along most of the length of said duct and providing an alternative flow path through said duct from said inlet to said outlet substantially free of obstruction by roots.

* * * * *